No. 852,198. PATENTED APR. 30, 1907.
F. PETMECKY.
LINING FOR PNEUMATIC TIRES AND OTHER PNEUMATIC ARTICLES.
APPLICATION FILED DEC. 22, 1906.
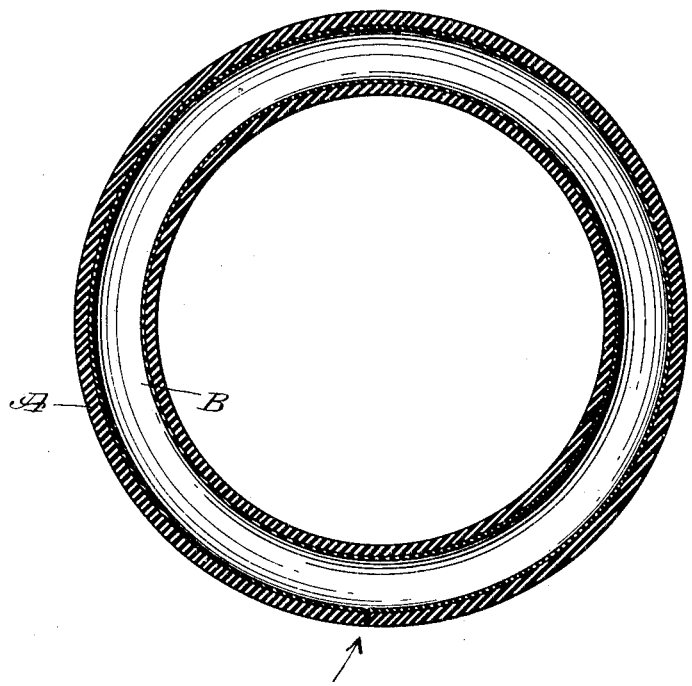
WITNESSES
INVENTOR
Fred Petmecky
BY
ATTORNEYS

UNITED STATES PATENT OFFICE.

FRED PETMECKY, OF AUSTIN, TEXAS.

LINING FOR PNEUMATIC TIRES AND OTHER PNEUMATIC ARTICLES.

No. 852,198.　　　　Specification of Letters Patent.　　　Patented April 30, 1907.

Application filed December 22, 1906. Serial No. 349,073.

*To all whom it may concern:*

Be it known that I, FRED PETMECKY, a citizen of the United States, and a resident of Austin, in the county of Travis and State of Texas, have invented a new and Improved Lining for Pneumatic Tires and other Pneumatic Articles, of which the following is a full, clear, and exact description.

The object of the invention is to provide a new and improved lining for pneumatic tires and other pneumatic rubber articles, and arranged to immediately and effectively heal or close a rupture in the article.

The invention consists of novel features and parts and combinations of the same, which will be more fully described hereinafter and then pointed out in the claims.

A practical embodiment of the invention is represented in the accompanying drawing forming a part of this specification, in which the figure is a cross section of a tire provided with the improvement and having the healed rupture.

The pneumatic tire A of a bicycle, automobile or like machine is provided at its inner face with a permanent lining B in the form of a film of viscous substance capable of adhering to the inner surface of the tire and of closing any rupture in the wall of the tire. For the purpose mentioned, I prefer to make the lining B of a composition of matter composed of the following ingredients in about the proportions specified, namely: dextrin, 12 ounces; water, 8 ounces; carbolic acid, ½ ounce; rubber solution, 5 ounces; fibers, 3 ounces.

In preparing the composition of matter dextrin is diluted with hot water to about the consistency of paste, and to this is added a portion of the rubber solution formed of pure rubber dissolved in gasolene or a like solvent. To the resultant mixture is added carbolic acid, and the remainder of the rubber solution, the several ingredients being thoroughly mixed by agitation, and then cotton fiber is added and the entire mixture is thoroughly agitated, to insure a uniform distribution of the fibers in the composition. The mixture produced forms a viscous composition, which is poured into the tire during the manufacture of the same or after the tire is finished, and the composition is distributed over the entire inner surface of the tire, so as to form a lining for the same in the form of a film of a viscous substance having cotton fibers uniformly distributed throughout the composition. Now when the wall of the rubber tire is ruptured, as indicated opposite the arrow in the drawing, then the pressure of the air inside the tire forces portions of the lining B adjacent to the rupture over and into the latter, thus healing or closing the rupture and preventing the escape of the compressed air from the tire. The lining is sufficiently viscous to prevent it from being blown through the rupture by the compressed air within the tire, and the lining is sufficiently elastic to be pressed into the rupture by the air, under pressure, contained in the tire. The portions of the lining passing into the rupture come in contact with the atmospheric air surrounding the tire, and hence the portion of the lining in the rupture hardens to effect a lasting healing of the rupture. The fibers contained in the lining give strength to the same and when a portion of the lining is pressed over and into the rupture, as above described, then the fibers form a close web or fabric which prevents the composition from being blown out of the rupture by the air under pressure and contained within the tire.

When the rupture takes place in the wall of the tire it is advisable for the operator to work the tire around the rupture with his fingers, so as to cause portions of the lining to readily pass into the rupture and harden therein, with a view to quickly form a permanent healing of the rupture.

Having thus described my invention, I claim as new and desire to secure by Letters Patent:

1. A lining for pneumatic tires and like pneumatic articles consisting of a thin permanent coating for the inner surface of the article, the coating being composed of dextrin, water, carbolic acid, a rubber solution, and cotton fibers in the proportion specified.

2. A lining for pneumatic tires and like pneumatic articles, consisting of a thin permanent coating for the inner surface of the article, the coating being composed of dextrin 12 oz.; water 8 oz.; carbolic acid ½ oz.; rubber solution 5 oz., and fibers 3 oz.

In testimony whereof I have signed my name to this specification in the presence of two subscribing witnesses.

FRED PETMECKY.

Witnesses:
　PAUL H. SMITH,
　MILES F. BYRNE.